United States Patent Office

3,123,487
Patented Mar. 3, 1964

3,123,487
PROCESS FOR DISPERSING CARBON BLACK PARTICLES INTO A CONTINUOUS MEDIUM
André Louis Verdier, 6 Ave. Daniel Lesueur,
Paris, France
Filed Oct. 8, 1959, Ser. No. 845,231
Claims priority, application France Nov. 7, 1955
5 Claims. (Cl. 106—253)

The present invention relates to a process for physically dispersing carbon black particles into a continuous medium such as a liquid agent, thereby manufacturing binary mixtures consisting of carbon black particles dispersed within a continuous medium. This application is a continuation-in-part of my copending application Ser. No. 619,248, filed on October 30, 1956, now abandoned.

The binary mixtures so produced may be later advantageously used as carbon black carriers in the manufacture of inks, paints and elastomers (natural and synthetic rubbers).

It is well known indeed that carbon black particles are used as pigments for manufacturing printing inks, paints, duplicating paper and plastics and as reinforcing agent in the rubber industry, especially in the manufacture of vehicle tires.

One of the mechanical characteristics which differentiates carbon black from other industrial pigments is the extreme fineness of its particles which at time of their manufacture have an average diameter ranging from 1,000 to 50 angstroms (a diameter approximately that of the protein molecules). The fineness of the black particles determines the color intensity and the reinforcing power of the carbon black load.

But the extreme fineness of these particles is responsible for the difficulty in storing and handling the black as well as for the dust resulting from these operations. Moreover, the volume occupied by the loose black is considerable, its bulk density ranging from about 0.06 to 0.2.

To obviate these drawbacks, the black may be transformed into pearls or pellets, in the dry state or in the presence of moisture. However the manufacturing costs are rather high and the particle properties are modified by the treatments applied.

Whatsoever the state of the black particles may be, it is difficult to effect a uniform dispersion of the black particles in a continuous medium, for example a liquid medium such as a paint binder.

This is due to an agglomeration of the carbon particles occurring during storage in silos or in bags.

A second agglomerating effect takes place at the time of dispersion, when the black is put into contact with the liquid medium, as a consequence of a surface stress action. The agglomerates of particles embedded within the liquid must subsequently be eliminated especially by crushing.

The pearls or pellets are at once easier to disperse than the loose blacks, but the agglomerates are more difficult to eliminate later on.

In the rubber industry, the black dispersion is still more difficult to effect, even by using heavy and expensive milling, mixing or masticating machines and it is impossible to completely eliminate the agglomerates.

Since the difficulty of dispersing the carbon black increases with the fineness of the particles, it often happens that a high grade black finally yields an ink or paint of average quality or a rubber tire having not an outstanding resistance to abrasion, due to the fact that the particles are not individually dispersed within the other components.

It is therefore an object of the invention to provide by dispersion a substantially individual coating of the carbon black particles by a continuous medium which protects the same from subsequent agglomeration and from the detrimental actions of the atmosphere.

A second object of the invention is to permit, by a dispersion of the carbon black particles into a continuous medium, an easy industrial utilization of the finest blacks available with conventional processes.

Another object of the invention is to disperse the carbon black particles in a continuous medium, in the liquid state, without any treatment on roller mills or like crushing machines.

Still another object of the invention is to improve by a preliminary dispersion of the carbon black particles the manufacture of products such as inks, paints and rubber mixtures using carbon black.

An additional object of the invention is still to allow, by a dispersion of the carbon black particles into a continuous medium, the handling and storing of the black in a small volume and without dust.

Other objects of the invention will become apparent as the description proceeds.

This invention applies only when the carbon black is produced by a partial combustion of gaseous or liquid hydrocarbons. In all such processes, the black particles are formed within a gaseous oxygenated medium (usually air), the oxygen content of which is reduced after the formation of the black. More precisely, the invention applies:

(1) When the carbon black is obtained by a partial combustion of gaseous or liquid hydrocarbons in a confined vessel (known as furnace blacks or combustion blacks, hereinafter called furnace blacks);

(2) When the black is produced by the impingement of a gas flame on a cooler surface (known as channel blacks, or impingement blacks or gas blacks, hereinafter called channel blacks).

According to the invention, the process for the manufacture of binary mixtures of predetermined composition consisting of carbon black particles dispersed in a continuous medium, said particles being continuously manufactured in a known manner by incomplete combustion of a hydrocarbon in a closed vessel fed with air according to one of the so-called "furnace black" and "channel black" processes, whereby said particles are surrounded after they have been produced by a gaseous medium having a reduced oxygen content, and said continuous medium consisting of a nonaqueous and nonvolatile substance easy to liquefy if not liquid at room temperature, capable of individually coating the carbon black particles and selected among the binders and plasticizers for paints, inks and elastomers, said process consists in that the carbon black particles, after they have been produced while kept in the presence of said gaseous medium issuing from said vessel and preserved from any contact with the outer atmosphere, are continuously supplied in parallel to several dispersing stages, comprising mechanical dispersing means, in that a flow of said continuous medium in a liquid condition is continuously and serially circulated through said dispersing stages, in that the ratio of the medium to black rates of supply at each stage is substantially larger than that corresponding to said predetermined composition, in that at each of said stages said dispersing is effected in the presence of said gaseous medium, and in that the homogeneous binary mixture delivered by the last one of said dispersing stages is concentrated in black by mechanical means such as squeezing, centrifuging, and filtering, and without drying, until it reaches said predetermined composition.

The fact that the black particles are dispersed without contact with the external atmosphere, but, on the contrary, in the presence of the gaseous medium of reduced oxygen content (comburated air) in which they have been formed, is essential. The continuous flow of particles from the oven to the dispersing stages causes the particles to be dispersed while they are "young."

Experiments have shown indeed that these conditions surprisingly prevent the formation of agglomerates, both while the particles are being conveyed to the dispersing stages and when they are put into contact with the continuous dispersion phase.

Practically, the requirement that the black particles be dispersed in the presence of the gaseous medium wherein they have been formed is complied with by the provision of dispersing stages which are fluid tight relatively to the surrounding atmosphere and in sealed communication with the black particle manufacturing vessel. The atmosphere within whole or part of the fluid-tight installation provided may be maintained at a slight overpressure as compared with the surrounding atmosphere.

The continuous medium used for dispersing the black is selected among the nonvolatile, nonaqueous substances which are in liquid state at the ambient temperature or easy to liquefy by heating, and which are used as binders or plasticizers in the composition of inks, paints, natural or synthetic rubbers.

This continuous medium must moreover be able, when in the liquid state, to coat individually the black particles. This property may be easily checked and is usually present in the binders and plasticizers used in preparing inks, paints or rubbers containing carbon black. Such substances are well known in the art. As far as rubber is concerned, the relevant substances have been listed, for example, in the treatise of J. Le Bras entitled "Eleménts de Science et Technologie du Caoutchouc," published by the French Institute of Rubber.

Especially the substances which may be used for performing the invention belong to the category of hydrocarbons, or natural oils, or oil varnishes, or high-boiling point esters.

The following table affords some data about these substances, stating their physical state at room temperature, the type of black to be preferably dispersed therewith, and the preferred use to be made of the dispersed black produced.

is independent of the output per hour and the provision of several dispersing stages fed in parallel permits the output of the oven in black particles to be disregarded.

The aforesaid output is also irrespective of the concentration (black/continuous phase) desired for the final dispersed black product.

The ratio black/liquid is preferably such that each stage is fed with a flow of liquid (either pure or already loaded with particles) sufficiently large to prevent any agglomerate from being present at the outlet of the corresponding dispersing stage.

For a carbon black of given quality, the rate of flow of the liquid medium must be increased if the quality desired for the dispersion is higher.

Similarly, the higher the grade (and therefore the fineness) of the black to be dispersed, the larger the liquid flow to be provided.

To effect the complete coating of the black particles, the volume of the continuous phase must be proportional to the surface area to be coated, the latter being, for a given mass of black, more extensive when the particle diameter is smaller.

In the case of channel blacks and furnace blacks, the respective proportions in the dispersion are of the order of 20 to 100 liters of liquid per kilogram of black according to the fineness of the black and the quality required for the dispersion.

Only the ratio of the rates of supply is to be taken into account, the rate of supply of liquid being high as compared with that of the black, the absolute value of the amount of liquid circulated being disregarded.

Consequently the quantity of liquid to be used (circulating in a closed circuit) is independent of the black output of the installation, which reacts only on the circulating velocity of the dispersion medium.

Preferably, the temperatures of the black and of the continuous phase at the moment when dispersion occurs should be adjusted.

The black temperature must be necessarily reduced below the flash point of the dispersing medium, so as to prevent any inflammation, and it must also be adjusted to prevent any alteration of the liquid phase properties.

| Group | Designation | Chemical definition | State at room temperature | Preferred type of black: F=furnace black; C=channel black | | Preferred final use |
|---|---|---|---|---|---|---|
| Fatty Acids | Stearic Acid | | Solid | F | C | Rubber. |
| Hydrocarbons | pine tar | aromatic hydrocarbons | highly viscous | F | | Do. |
|  | petroleum oils | aromatic naphthalenic or paraffinic hydrocarbons. | viscous | F | C | Do. |
|  |  |  |  | F | C | Do. |
|  | synthesis oils [1] | | fluid | F | | Do. |
| Natural oils and oil varnishes. | siccative oils | linseed oil, China wood oil. | do | | C | oil paints. |
|  | oil varnish | mainly composed of natural oil and synthetic or natural resins (e.g. glycerophthalic). | highly viscous | | C | lacquers and varnish-containing paints. |
| Nigh B.P. esters | phthalates | dimethyl pht | fluid | F | C | synthetic rubbers. |
|  |  | diethyl pht | do | | C | plastics. |
|  |  | dibutyl pht | do | | C | synthetic and cellulose lacquers and paints. |
|  | phosphoric esters | tricresylphosphate | do | | C | plastics, synthetic and cellulose lacquers and paints. |

[1] By synthesis oils is meant aryl-hydrocarbons of petroleum origin having alphyl chains fixed thereon by addition reactions.

The number of dispersing stages involved may, on an average, range from 2 to 5, but it may be as high as 8 in the case of very fine black (channel blacks).

At each stage, the dispersing operation takes place in the presence of an excess of liquid with respect to the composition of the final dispersed black product.

More precisely, the proportion of black and liquid rates of supply is determined only as a function of the quality desired for the resulting dispersed black. This proportion Practically, the black must not be cooled below a temperature of about 50° C., and this cooling action may take place in the fluid-tight conveyor connecting the black manufacturing vessel to the dispersing stages. When the black has reached the desired dispersing temperature, it should advantageously be maintained at such a temperature until being incorporated within the continuous medium.

The viscosity of the continuous dispersing medium may also be reduced by a preheating step to a temperature usually ranging about from 100° C. to 120° C. and corresponding to the minimum degree of viscosity.

According to a preferred embodiment of the invention, the temperature of the dispersing medium is increased at each dispersing step, so that the viscosity of said medium is reduced in proportion to its content of carbon black. The black concentration may thus be raised at each stage, while the formation of agglomerates is prevented.

The calories necessary to heat the continuous dispersing medium to a more fluid state may be derived from the black manufacturing unit by means of heat exchangers with the use of a heat-conveying agent such as water, the temperature adjustment being effected by adding cold water.

The dispersing of the carbon black particles into the continuous phase, free of such particles or already loaded therewith, is preferably carried on by means of continuous dispersing devices using mechanical means to throw said particles into the liquid medium. These devices, hereinafter called homogenizers, are to be adapted to operate under airtight conditions and preferably include a heat regulation system.

Once the dispersed black has left the last homogenizer, it may easily be incorporated into the final product. However, the proportion of continuous medium contained therein is generally too high. Accordingly the binary mixture thus produced is concentrated by mechanical means (squeezing, centrifuging, filtering), these operations being preferably performed at a temperature corresponding to the minimum viscosity of the binary mixture treated.

Experiments have surprisingly evidenced that after the black particles are perfectly dispersed, the black content of the mixture may be increased as disclosed without destroying the continuous phase layer, which forms an individual coating around each black particle. The same would not be true if the concentration of the mixture were obtained by a thermal procedure (for example, by heating to cause evaporation of the liquid medium).

As the continuous phase used in the dispersing process is precisely one of the components, other than the black, present in the formulae of inks, paints, or rubber mixtures, any detrimental reaction between the continuous medium of the dispersion prepared according to the invention and the other components of this product are avoided.

Moreover, experiments have shown also that black particles which are individually coated in a continuous medium may subsequently be diluted again in the same medium without substantial power consumption and may moreover be incorporated very easily into any other liquid or stiff medium. Consequently, the black content in the dispersed black produced may be advantageously increased up to the highest possible value which is consistent with a moderate power consumption. For example, a percentage of 77% of black for 23% of liquid in weights has been found satisfactory.

When the dispersing medium is viscous at room temperature, the portion remaining in contact with the black recovers its viscosity after the concentration step, whereby substantially compact blocks may be obtained which facilitate storing and shipping.

Since some of the products used for dispersing the black are among those employed as binders in the paint industry or as plasticizers in the rubber industry, the black dispersed, at time of its manufacture, in a given continuous medium may find a wide range of possible applications. This fact is, from the economic point of view, an argument for applying the dispersing process soon at the manufacturing stage as disclosed by the invention.

Two specific embodiments of the invention will now be described by way of nonlimiting examples, with reference to the accompanying drawings, in which.

Figure 1:
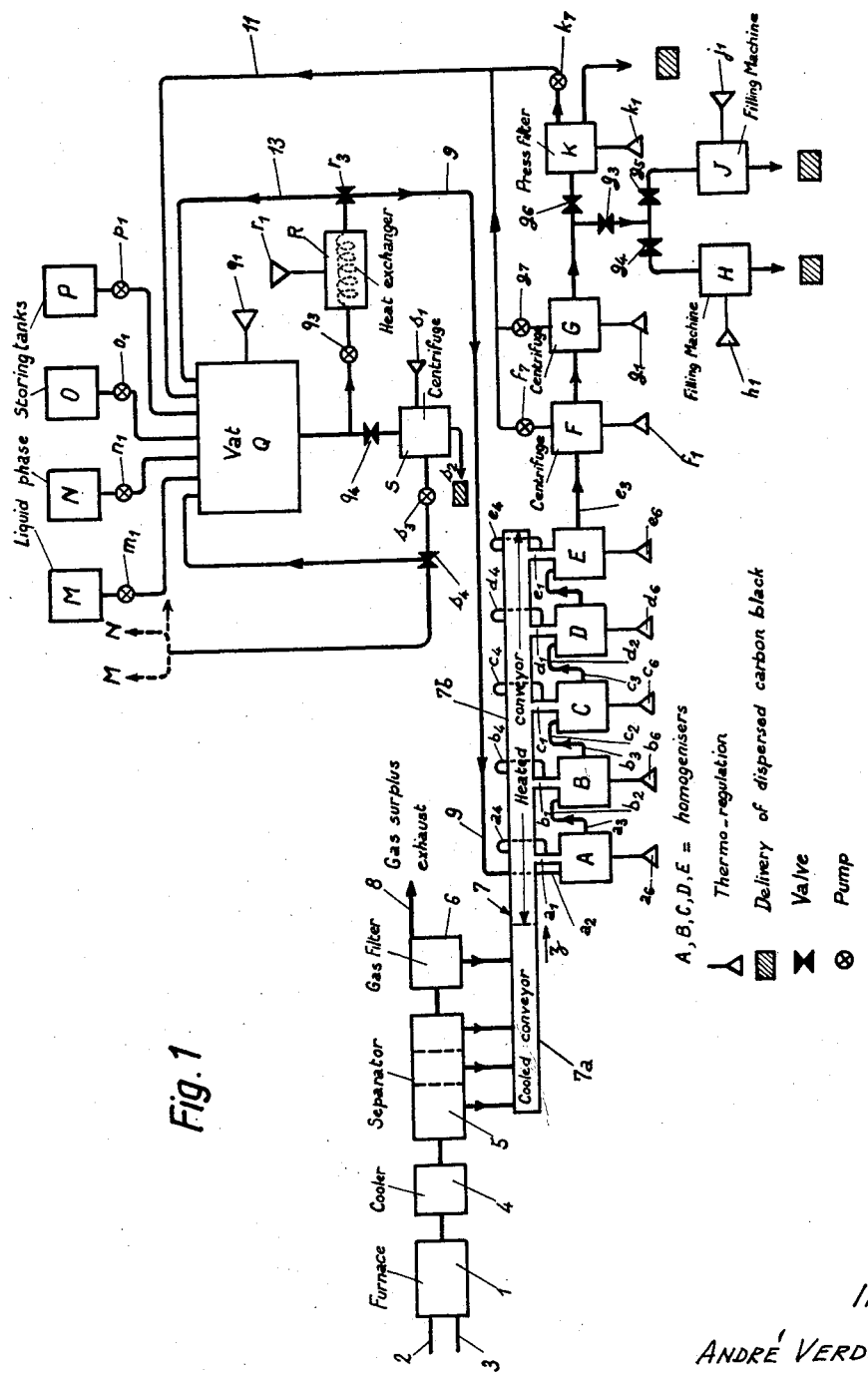
FIGURE 1 is a block diagram relating to the dispersion of furnace black.

Referring to FIG. 1, the installation for manufacturing furnace black conventionally comprises a furnace 1 wherein air is fed by a duct 2 and the aromatic hydrocarbons by a duct 3 in a vaporized or atomized state.

The gases and the black particles formed in the furnace, both at a temperature of about 1300–1600° C., are conveyed to a cooling tower 4 where their temperature drops to 300° C., and then to a battery of separators 5. The gases are then sent to a chamber 6 where they are filtered.

The separator 5 and gas filter 6 steadily deliver the carbon black particles into a conveyor 7 which continuously drains them in the $z$ direction to the dispersing stages.

According to the invention, the stages 4, 5 and 6, as well as the conveyor 7, are airtightly fitted and a gaseous communication is arranged therebetween so that a substantial proportion of the combustion gases is fed to the conveyor 7, the surplus being discharged at 8 into the air.

The stages 4, 5, 6 and the upstream part $7a$ of conveyor 7 are cooled, for instance, by water jackets.

The black collected at the head part $7a$ of the conveyor 7 is at an average temperature of 200° C. which is lowered, for example, down to 90° C. at the opposite end of the part $7a$ of the conveyor.

The dispersion unit is located immediately after the part $7a$ of the conveyor 7 according to the direction $z$. This unit comprises a battery of five homogenizers A, B, C, D, E which are tight to the external air and supplied in parallel with black particles by the downstream part $7b$ of the conveyor 7 which is kept at a constant temperature (for instance 90° C.) by convenient means such as a water jacket.

The inlets $a_1, b_1 \ldots e_1$ of the homogenizers A, B, . . . E provided for the black particles and leading to the dispersing means contained therein are airtightly connected to the aforesaid part $7b$ of conveyor 7.

Controlling means are provided at each of these inlets to control the input rate of the carbon black particles delivered thereto by the conveyor.

The dispersion medium is fed to the first homogenizer A of the battery by a feeding pipe 9 connected to the inlet $a_2$ of this homogenizer, provided for the dispersion medium. The outlet $a_3$ of the homogenizer A, which delivers the liquid phase having carbon black particles dispersed therein, is tightly connected to the inlet $b_2$ of homogenizer B whose outlet $b_3$ is connected to the inlet $c_2$ of homogenizer C and so forth to homogenizer E which still receives carbon black particles from conveyor $7b$ and disperses the same into the binary mixture delivered by homogenizer D.

Each of the homogenizers A, B, . . . E contains mechanical means, such as high-speed rotating means, for ensuring a continuous dispersion of the carbon black into the continuous medium by continuously throwing the carbon black particles into a flow of said liquid phase, the latter being continuously and serially circulated through all homogenizers of the battery, said incorporation being performed in the presence of the combustion gases issued from furnace 1.

Since a very strong vacuum is created within the dispersion chamber of the homogenizers, a communicating duct $a_4, b_4 \ldots e_4$ is respectively provided between the corresponding chamber and the conveyor 7 for equalizing the pressures so as to prevent any introduction of external air into the same.

Means are also provided for controlling the temperature of the dispersing chamber of each homogenizer of the battery. These means may consist of a double jacket supplied with water at a servo-controlled temperature. The thermoregulating device of each homogenizer is diagrammatically shown in $a_6, b_6 \ldots e_6$.

The homogenizer E supplies two isothermal centrifugal decanters F and G which are mounted in series and provided with temperature controllers $f_1, g_1$. These decanters serve to remove the excess liquid and to thereby concentrate the carbon black in the mixture.

The decanter G is connected through valves $g_3, g_4, g_5$ to two isothermal filling and weighing devices H and J under the temperature control of the servo control $h_1$ or $j_1$.

The output of the decanter G may also be supplied through a valve $g_6$ to an extracting press filter K, also provided with a temperature control system $h_1$.

The number of apparatus such as F, G and K used for increasing the black content of the binary mixture obtained is dependent on the character and fineness of the black and on the nature of the liquid and desired concentration. In these apparatus, the thermal regulation of concentrating apparatus, such as F, G and K, allows the operation to be performed at a temperature corresponding to the minimum viscosity of the continuous dispersing medium without substantial evaporation of said medium.

The circuit for regenerating the dispersing medium comprises storing tanks M, N, O, P, the number of which corresponds to the number of liquids to be mixed for constituting the continuous dispersing medium having the desired composition. Each tank M . . . P is provided with a pump $m_1 \ldots p_1$, connecting it to an intermediate double-wall vat Q provided with a temperature-regulating device $q_1$ for maintaining the same at a constant temperature.

The vat Q which contains stirring means is fed by the pipe 11 with the continuous medium delivered by the concentrating stages F, G, K through pumps $f_7, g_7, k_7$.

At the outlet of the vat Q, a volumetric pump $q_3$ leads to a heat exchanger R having a heat-regulating system $r_1$. A valve $r_3$ drives the liquid issued from stage R either to the pipe 9 and thereby to the inlet $a_2$ of homogenizer A, or back to the vat Q via the duct 13.

A valve $q_4$ connected to the vat Q opens onto a centrifugal machine S, provided with a heat regulator $s_1$, and intended to remove the black particles which may remain in the dispersing medium. Said black is drained at $s_2$. A pump $s_3$ and a valve $s_4$ are provided to return the liquid phase to the vat Q or to the tanks M . . . P.

The installation operates as follows:

The liquid in the vat Q is circulated in a closed circuit through the heat exchanger R by the pump $q_3$ until the temperature required for being introduced into the homogenizer A is reached.

In the meantime, all the homogenizers A, B, . . . E have been heated to the required temperature. The valve $r_3$ is then actuated so that the heated dispersion medium is fed to pipe 9 and successively circulates through stages A, B, . . . E, F, G, K and back to the vat Q via pipe 11.

Generally this temperature corresponds to a viscosity for the liquid medium of about 8–10 centipoises, but may possibly be smaller (3–4 centipoises) for dispersing very fine blacks.

When stable operating conditions are obtained concerning the liquid and air rates of flow and the distribution of temperatures at each stage, the feeding of conveyor 7 with black particles is started.

The black percentage fed to homogenizer A and dispersed therein ranges from about 20 to 65%, depending on the type of black, on the liquid, and on the quality of the dispersion, it being understood that any agglomerates are to be avoided. There is thus produced at $a_3$ a mixture which is still very fluid due to the high rate of liquid supply as compared to the black supply but more viscous than the pure liquid fed at $a_2$.

As the homogenizer B is heated to a temperature higher than that of A, the viscosity of the mixture delivered by homogenizer A is reduced accordingly. It receives a new load of black particles in homogenizer B, the rate of the black input therein being the maximum permissible for obtaining the same quality of dispersion at the outlet of B.

This mixture having a higher black content is sent to homogenizer C, and so on, the temperatures in the homogenizers being gradually increased from A to E, while the percentage of manufactured black which is absorbed is gradually reduced.

The last homogenizer E is compulsorily so adjusted as to absorb the remaining black percentage fed by the conveyor 7, its temperature being as high as allowed by the kind of liquid used.

In the binary mixture delivered at $e_3$, the percentage of black corresponds to the ratio: (output per hour of the unit)/(output per hour of the pump $q_3$ towards homogenizer A).

This ratio substantially ranges from 20 to 100 liters of liquid per kilogram of black.

An important fraction of the continuous dispersing phase is thereafter removed by the decanters F and G which are so adjusted as to provide a constant black/liquid percentage for a given quality of black and a liquid of well-defined composition.

Should the black concentration of the binary mixture from decanters F and G be deemed sufficient for subsequent utilization, then the valve $g_6$ is closed while the valves $g_3, g_4, g_5$ are open.

The dispersed black is weighed and either put into cans at stage H if the continuous medium is liquid at room temperature or put into molds at stage J if it is solid in the same conditions.

In case a higher black concentration is desired, the dispersed black is partly or wholly directed to press K.

For example, a black-hydrocarbon mixture for incorporation in printing ink is put into cans for shipment. The same mixture is pressed into highly concentrated masses for the rubber industry. A black-pine tar mixture may be packed into molds wherein it solidifies after cooling, or may also be pressed for increasing the black content.

The molding and pressing steps are effected in the hot state, the products being subsequently cooled until their consistency becomes sufficient to allow for packing and handling of the dispersed black.

Figure 2:
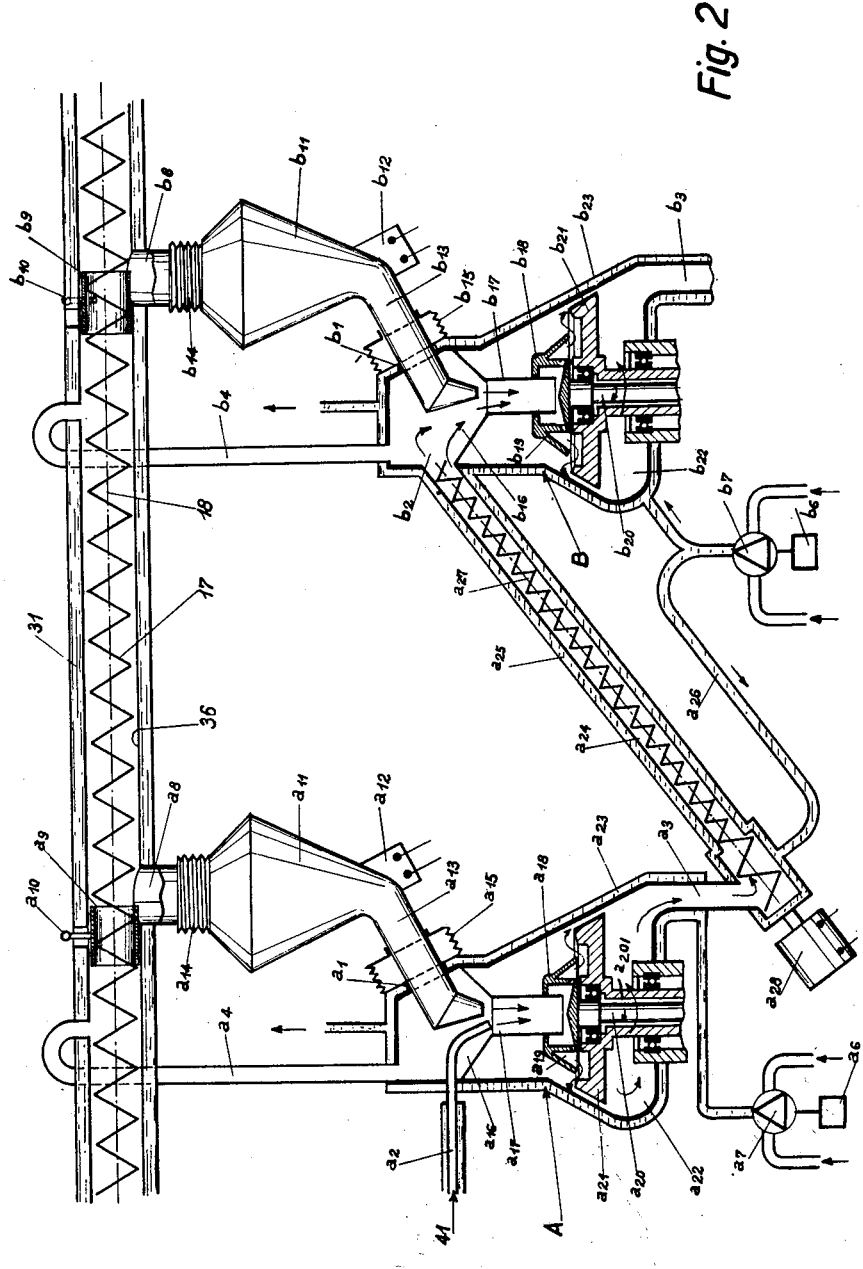
FIGURE 2 is a diagram showing in axial section a group of two successive homogenizers.

The structure of two successive homogenizers A and B is now described in detail with reference to FIG. 2.

Conveyor 7 has an opening $a_8$ for feeding the first homogenizer A, said opening being provided with an adjustable throttle consisting of a sliding sleeve $a_9$ having an operating handle $a_{10}$.

The opening $a_8$ opens onto a hopper $a_{11}$ including a vibrator $a_{12}$ controlling the rate of flow into a pipe $a_{13}$ passing through the inlet $a_1$ of the homogenizer. This connection is made fluid tight with respect to the surrounding atmosphere by means of bellows $a_{14}, a_{15}$.

The pipe $a_{13}$ and the feed duct $a_2$ of the dispersing liquid open onto a chamber $a_{16}$. A feed pipe $a_{17}$ leads the black and the liquid to a rotating distributor $a_{18}$ which has holes $a_{19}$ therein and which is carried by a driving shaft $a_{20}$ causing the distributor to rotate in a certain direction.

The distributor $a_{18}$ is partly received in a laminating annular recess $a_{21}$ which is rotatably mounted and is driven by a shaft $a_{201}$ rotating in a direction opposite to the preceding shaft. Provided beneath the annular recess $a_{21}$ is a chamber $a_{22}$ communicating with the outlet duct $a_3$.

The homogenizer A is enclosed in a double-walled casing $a_{23}$ connected to a three-way valve $a_7$ also connected to two pipes 15, 16 respectively feeding hot and cold water.

The outlet duct $a_3$ is connected to the inlet $b_2$ of the homogenizer B by a duct $a_{24}$ having a double casing $a_{25}$ which is connected to the valve $b_7$ by a pipe $a_{26}$ for receiving the liquid at a controlled temperature. The valve $b_7$ is fed by two pipes 25, 26 respectively supplying hot and cold water.

The duct $a_{24}$ contains an endless screw $a_{27}$ which is driven by a variable speed electric motor $a_{28}$.

A similar arrangement is provided for homogenizer B, wherein the similar components are designated by letter $b$ provided with corresponding subscript numerals.

It will be readily understood that by varying with the sleeve $a_9$ the surface of the inlet opening $a_8$, the quantity of black fed to hopper $a_{11}$ may be adjusted. Vibrator $a_{12}$ ensures a uniform distribution of the black particles to the distributor $a_{18}$ rotating at high speed. The black particles are caused to pass through the openings $a_{19}$ thereof through which the liquid medium fed by the pipe $a_2$ is drawn simultaneously. The liquid is laminated by engagement with the annular recess $a_{21}$ rotating at very high speed in opposite direction, then caused to impinge against the wall of the homogenizer and thereafter subjected to a colloidal milling step. The resulting product collected in chamber $a_{22}$ is a perfectly homogenous mixture. All these steps are performed in the presence of the gaseous medium with reduced oxygen content wherein the black particles have been formed, the moisture content of said medium being substantially zero.

The mixture in chamber $a_{22}$ is discharged by the outlet $a_3$ into the duct $a_{24}$ wherein it is reheated. The screw $a_{27}$ conveys the mixture into the inlet opening $b_2$ and so forth.

Figure 3:
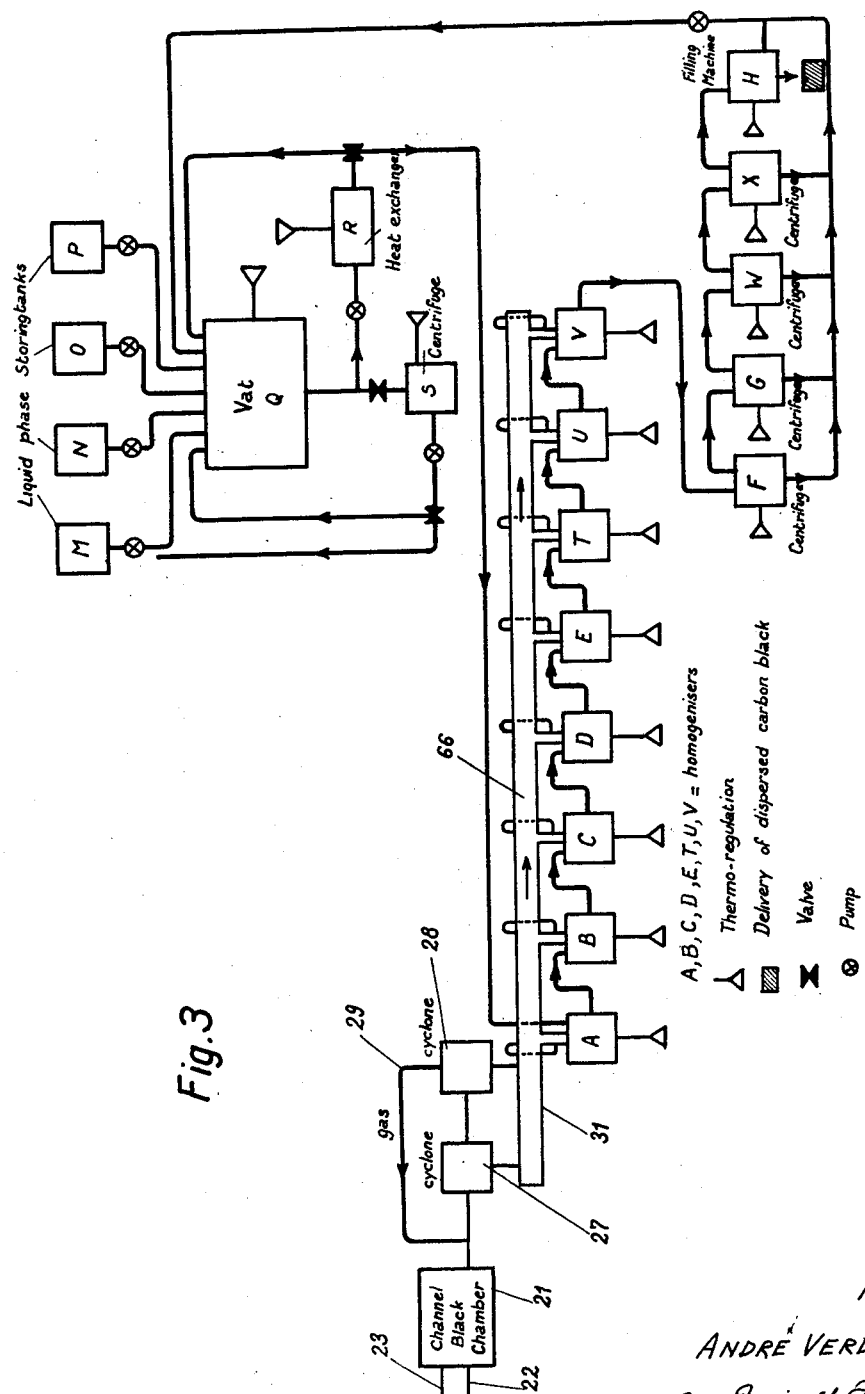
FIGURE 3 is a block diagram concerning the dispersion of channel black.

In the installation of FIG. 3, provided for the dispersion of channel black, 21 designates one of the chambers where the carbon black is formed by deposition, the installation comprising several chambers of this kind. The hydrocarbon is fed to the burners (not shown) by the pipe 22 and combustion air by the pipe 23. The carbon black particles scraped from chamber 21 and surrounded by a gaseous medium having a reduced oxygen content are fed to two cyclones 27, 28 disposed in series and provided with a gas feedback 29.

The black particles are discharged from the cyclones to a conveyor 31 similar to conveyor 7 of FIG. 1 but which is not cooled in this case since the temperature of the black particles is much lower than in the case of furnace black. The various parts are in tight relation and especially the gaseous medium in conveyor 31 is only that issued from the chamber 21 wherein the black particles have been formed.

The average diameter of the thus-produced black particles is about 200 angstroms.

The dispersing unit in this case comprises eight serially mounted homogenizers A, B, C, D, E, T, U, V fed in parallel by conveyor 31 and serially disposed with respect to the circuit of the mixture delivered, the same as in FIG. 1.

The concentrating unit for the dispersed black comprises four centrifugal decanters F, G, W, X and a filling and weighing station H. The system for circulating the dispersing medium and complying with the various requirements therefor, the heat control apparatus, and the procedure are the same as in the case of FIG. 1.

It is clear that it is possible within the scope of the appended claims to depart from the installations of FIGS. 1 and 3.

For instance, the number of homogenizers depends upon the rate of dispersion of the black, upon the black output per hour of the unit, and is increased at the same time as the fineness of the black.

*Example 1.*—Furnace black of the HAF type discharged at a rate of 150 kilograms per hour is dispersed in heated pine tar which is fed to the first homogenizer A at a rate of 6,750 liters per hour. The outlet temperature of the mixture from the last homogenizer E is 102° C. and, after removal of the liquid in excess by mechanical means, there is left a mixture of 150 kilograms black with 150 kilograms pine tar. After being molded at J and then cooled, said mixture presents itself as blocks which are solid at room temperature and have a 50% black content. Such blocks may be used in rubber mixtures.

*Example 2.*—The same furnace black of the HAF type discharged at a rate of 150 kilograms per hour is dispersed in a hydrocarbon obtained from high boiling point products of petroleum distillation and more precisely consisting of aromatic fractions formed during the refining of high grade lubricating oils, either by means of selective solvents or by vacuum distillation. This substance is fed in the liquid state to the first homogenizer A at a rate of 6,750 liters per hour. The temperature of the mixture at the outlet of the last homogenizer E is about 142° C., and after removal of the liquid in excess by mechanical means, there is left a mixture of 150 kilograms of black with 150 kilograms of petroleum oil. This mixture is then concentrated at K by the press, which produces a mixture of 150 kilograms of black for 75 kilograms of oil. The blocks emerging from the press have a 66.6% black content. These blocks may also be used for the rubber mixtures.

*Example 3.*—The same furnace black of the HAF type is dispersed in the same heated petroleum oil fed to the first homogenizer at a rate of 8,000 liters per hour. The temperature of the mixture at the outlet of the last homogenizer E is 125° C. and, after removal of the liquid in excess by mechanical means, there is left a mixture of 150 kilograms of black for 150 kilograms of petroleum oil. This mixture, while still hot, is directly weighed in cans at H for shipment in the form of a thick paste having a 50% black content. Such a paste may be used for the production of printing inks.

*Example 4.*—A furnace black of the SRF type is dispersed in heated pine tar which is fed to the first homogenizer A at a rate of 5,000 liters per hour. The temperature of the mixture at the outlet of the last homogenizer E is 95° C. and, after removal of the liquid in excess by mechanical means, there is left a mixture of 220 kilograms of black for 220 kilograms of pine tar. After being molded at J and then cooled, the mixture has the shape of blocks which are solid at room temperature and have a 50% black content. These blocks may be used for the rubber mixtures.

*Example 5.*—A channel black (of high grade, having an oil-absorbing capacity of 130 kilograms for 100 kilograms of black) is discharged at the rate of 60 kilograms per hour and dispersed in glycerophthalic varnish having a 40% dry extract content. The varnish is fed to the first homogenizer A at a rate of 6,000 liters per hour. The temperature of the mixture at the outlet of the last homogenizer V is 85° C. After removal by mechanical means of the liquid in excess, there is left a mixture of 60 kilograms of black with 240 kilograms of varnish. This mixture, while still hot, is directly weighed in cans at H for shipment in the form of a thick paste having a 20% black content. Such a paste may be used in the manufacture of lacquers for vehicle bodies.

*Example 6.*—A channel black (of common grade, having an oil-absorbing capacity of 75 kilograms for 100 gilograms of black) is discharged at the rate of 75 kilograms per hour and dispersed in a heated oil varnish which is fed to the first homogenizer A at a rate of 8,000 liters per hour. The temperature of the mixture at the outlet of the last homogenizer V is 95° C. After removal by mechanical means of the liquid in excess, there are left 180 kilograms of black for 180 kilograms of oil varnish. The mixture, while still hot, is directly weighed in cans at H for shipment in the form of a thick paste having a 50% black content. This mixture may be used for manufacturing printing inks.

*Example 7.*—A channel black (of the EPC type for rubber) is discharged at a rate of 180 kilograms per hour and dispersed in heated pine tar which is fed to the first homogenizer A at a rate of 9,000 liters per hour. The temperature of the mixture at the outlet of the last homogenizer A is 102° C. After removal by mechanical means of the liquid in excess, there is left a mixture of 180 kilograms of black with 180 kilograms of pine tar. This mixture is concentrated by the press, which produces a mixture of 180 kilograms of black for 90 kilograms of pine tar. The resulting solid blocks have a 66.6% black content. These blocks may be used in the composition of rubber mixtures.

As evidence of the practical usefulness of the invention, there will be given a few numeral illustrations of the utilization of the various dispersed blacks of standard composition which are manufactured by the process according to the invention.

The following examples which are numbered 1a, 2a, 3a, 5a, 6a correspond to the above examples numbered 1, 2, 3, 5, 6.

*Example 1a.*—*Rubber mixture for soles.*—100 kilograms of natural rubber are kneaded in an internal mixer or two-roller mixer according to the usual practice. Then 80 kilograms of HAF black blocks containing 50% pine tar are added. Under the action of the heat generated by the kneading operation, the blocks are softened and become rapidly blended with the gum. Finally, 20 kilograms of an active white charge, and then 23 kilograms of vulcanization agents according to the usual composition (sulphur, zinc oxide, stearic acid, accelerators) are incorporated. Finally, the composition is as follows:

100 kg. natural rubber
    40 kg. HAF furnace black
    20 kg. active white charge
    40 kg. pine tar
    23 kg. vulcanization agents

*Example 2a.*—*Rubber mixture for tire-bearing surface.*—According to the same procedure, 100 kilograms of natural rubber are kneaded, then 90 kilograms of HAF black blocks containing 33% petroleum oil, and finally 13 kilograms of sulphur+zinc oxide+stearic acid +vulcanization accelerators are added. Finally, the composition is as follows:

100 kg. natural rubber
    60 kg. HAF furnace black
    30 kg. petroleum oil as defined in the example
    13 kg. vulcanization agents

*Example 3a.*—*Newspaper ink.*—For preparing 100 kilograms of newspaper printing ink of the following composition: 12% furnace black, 88% petroleum oil:

(1) 76 kg. of petroleum oil as defined in the black manufacturing Example No. 3 are poured into a stirring vat;

(2) 24 kg. of the thick paste of HAF black with 50% petroleum oil are gradually poured in the same vat, while stirring. The paste is diluted and a homogenous ink is obtained within a few minutes.

*Example 5a.*—*Black lacquer for vehicle bodies.*—The following composition is prepared:

| | Percent |
|---|---|
| Channel black | Over 3 |
| Glycerophthalic varnish (40% dry extract) | 48 |
| Glycerophthalic varnish (60% dry extract) | 36 |
| Other components (solvent, diluting agent) | 13 |

Same procedure as for Example 3a, but with a higher power requirement for the stirring members, due to the varnish viscosity, this requirement (about 1–2 HP in the case of Example 3a) being of 6–8 HP in this example. There is poured into the stirring vat:

(1) 36 kg. of varnish (60% dry extract)
    36 kg. of varnish (40% dry extract)

(2) In a gradual manner, 15 kg. of the thick paste containing 20% channel black and 80% varnish at 40%, viz. the 3 kilograms of channel black mentioned in the composition and 12 kilograms of varnish at 40%

The amount of varnish at 40% is therefore: 36+12=48 kg.

(3) The 13 kg. of solvent and diluting agent.

*Example 6a.*—*Typographic printing ink.*—100 kilograms of ink of the following composition are prepared:

24% channel black of average grade
38% natural oil varnish
38% synthetic varnish Same is poured into the stirring vat:

(1) 38 kg. synthetic varnish
    14 kg. of the same oil varnish as in the black manufacturing Example No. 6.

(2) 48 kg. of a thick paste comprising 50% channel black and 50% oil varnish thick paste, i.e.:
    24 kg. channel black, and
    25 kg. oil varnish (24+14=38 kg. for the total composition)

It will be noticed that the compositions of binary black and plasticizer mixtures obtained by the process according to the invention are unusual due to the high plasticizer content. With the usual procedures, such compositions would lead to too soft mixtures which would result, due to the lack of reaction in the mixer, to black dispersions which would be still less satisfactory than those produced at present.

On the contrary, with the process according to the invention, such high plasticizer percentages are acceptable, since the black is perfectly dispersed and its action is enhanced to the maximum extent. There is thus provided a saving both of driving power and rubber, which is an important result, as rubber is more expensive than plasticizer.

What is claimed is:

1. A process for the manufacture of binary mixtures of a predetermined composition consisting of carbon black particles selected from the group consisting of furnace black particles and channel black particles, dispersed in a continuous medium, said particles being formed by incomplete combustion of hydrocarbons in a vessel fed with air, said carbon black particles being surrounded by combustion gases after they have been formed, said continuous medium being selected from the group consisting of stearic acid, pine tar, esters, petroleum oils, synthetic oils, siccative oils, and oil varnishes, said continuous medium being liquid at the operating temperatures of the process and capable of coating the individual particles of said carbon black, said process comprising continuously circulating said continuous medium in a liquid condition within a closed circuit through several stages of dispersion arranged in series with each other and in sealed communication with said vessel, each stage comprising mechanical dispersing means, supplying said stages in parallel with said carbon black particles which are continuously conveyed from said vessel in the presence of said combustion gases, the ratio of the liquid to black rates of supply being, at each stage, substantially larger than that corresponding to said predetermined composition, and mechanically removing the excess amount of continuous medium in the binary mixture delivered by the last one of said dispersing stages, without drying, until the concentration of the black particles in the remaining binary mixture reaches said predetermined composition.

2. A process for the manufacture of binary mixtures of a predetermined composition consisting of carbon black particles dispersed in a continuous medium, said particles being selected from the group consisting of furnace black particles and channel black particles, said particles being continuously produced by incomplete combustion of a hydrocarbon in a closed vessel fed with air so that said particles are surrounded after they have been produced by a gaseous medium having a reduced oxygen content, said continuous medium being selected from the group consisting of stearic acid, pine tar, esters, petroleum oils, synthetic oils, siccative oils, and oil varnishes, said continuous medium being liquid at the operating temperatures of the process and capable of coating said particles when in a liquid state, said process comprising continuously supplying said carbon black particles in parallel to several airtight dispersing stages, simultaneously maintaining said carbon black particles in the presence of said gaseous medium issuing from said vessel and preserving said carbon black particles from any contact with the outer atmosphere, said dispersing stages comprising rotating mechanical dispersing means, circulating a flow of said continuous medium in a liquid condition continuously and serially through said dispersing stages, said carbon black particles being mechanically mixed into said liquid flow at each of said stages by said dispersing means, said mixing being effected in the presence of said gaseous medium carried along with said particles, adjusting the ratio of the continuous medium to carbon black rates of supply at each of said dispersing stages to a value substantially larger than that corresponding to said predetermined composition, and increasing the concentration of carbon black particles in the binary mixture delivered by the last one of said dispersing stages by mechanical means and without drying until said binary mixture reaches said predetermined composition.

3. A process for the manufacture of binary mixtures of a predetermined composition consisting of carbon black particles selected from the group consisting of furnace black particles and channel black particles, dispersed in a continuous medium, said particles being formed by incomplete combustion of hydrocarbons in a vessel fed with air, said carbon black particles being surrounded by combustion gases after they have been formed, said continuous medium being selected from the group consisting of stearic acid, pine tar, esters, petroleum oils, synthetic oils, siccative oils, and oil varnishes, said continuous medium being liquid at the operating temperatures of the process and capable of coating the individual particles of said carbon black, said process comprising continuously circulating said continuous medium in a liquid condition within a closed circuit through several stages of dispersion arranged in series with each other and in sealed communication with said vessel, each stage comprising mechanical dispersing means, supplying said stages in parallel with said carbon black particles which are continuously conveyed from said vessel in the presence of said combustion gases, the ratio of the liquid to black rates of supply being, at each stage, substantially larger than that of said predetermined composition and substantially corresponding per unit of time to a rate of flow of 20 to 100 liters of said dispersing medium circulated through said dispersing stages for a total supply of carbon black to the same stages of about one kilogram, and mechanically removing the excess amount of continuous medium in the binary mixture delivered by the last one of said dispersing stages, without drying, until the concentration of the black particles in the remaining binary mixture reaches said predetermined composition.

4. A process for the manufacture of binary mixtures of a predetermine composition consisting of carbon black particles selected from the group consisting of furnace black particles and channel black particles, dispersed in a continuous medium, said particles being formed by an incomplete combustion of hydrocarbons in a vessel fed with air, said carbon black particles being surrounded after they have been formed by combustion gases, said continuous medium being selected from the group consisting of stearic acid, pine tar, esters, petroleum oils, synthetic oils, siccative oils, and oil varnishes, said continuous medium being liquid at the operating temperatures of the process and capable of coating the individual particles of said carbon black, said process comprising continuously circulating said continuous medium in a liquid condition within a closed circuit through several stages of dispersion arranged in series with each other and in sealed communication with said vessel, each stage comprising mechanical dispersing means and heating means, gradually increasing at each stage the temperature of said circulated continuous medium, the temperature range of the continuous medium extending from about 80° C. to about 150° C., supplying said stages in parallel with said carbon black particles which are continuously conveyed from said vessel in the presence of said combustion gases, the ratio of the liquid to black rates of supply being, at each stage, substantially larger than that corresponding to said predetermined composition and sufficiently large to prevent the formation of any agglomerate of said carbon black particles within the mixture, and mechanically removing the excess amount of continuous medium in the binary mixture delivered by the last one of said dispersing stages, without drying, until the concentration of the black particles in the remaining binary mixture reaches said predetermined composition.

5. A process for the manufacture of binary mixtures of a predetermine composition consisting of carbon black particles selected from the group consisting of furnace black particles and channel black particles, dispersed in a continuous medium, said particles being formed by an incomplete combustion of hydrocarbons in a vessel fed with air, said carbon black particles being surrounded after they have been formed by combustion gases, said continuous medium being selected from the group consisting of stearic acid, pine tar, esters, petroleum oils, synthetic oils, siccative oils, and oil varnishes, said continuous medium being liquid at the operating temperatures of the process and capable of coating the individual particles of said carbon black, said process comprising continuously circulating said continuous medium in a liquid condition within a closed circuit through several stages of dispersion arranged in series with each other and in sealed communication with said vessel, each stage comprising dispensing means and heating means, gradually increasing at each stage the temperature of said circulated continuous medium, the temperature range of the continuous medium extending from about 80° C. to about 150° C., supplying said stages in parallel with said carbon black particles at a temperature of about 90° C., said carbon black particles being continuously conveyed from said vessel in the presence of said combustion gases, the ratio of the liquid to black rates of supply being, at each stage, substantially larger than that corresponding to said predetermined composition and substantially corresponding per unit of time to a rate of flow of 20 to 100 liters of said dispersing medium serially circulated through said dispersing stages for a total supply of carbon black particles to said stages of about one kilogram, the dispersion being effected in the presence of said combustion gases, and mechanically removing the excess amount of continuous medium in the binary mixture delivered by the last one of said dispersing stages, without drying, until the concentration of the black particles in the remaining binary mixture reaches said predetermined composition.

References Cited in the file of this patent
UNITED STATES PATENTS

| | | |
|---|---|---|
| 1,263,082 | Lewis | Apr. 16, 1918 |
| 2,232,426 | Barrett | Feb. 18, 1941 |
| 2,290,914 | Machlin | July 28, 1942 |
| 2,544,363 | Siemons | Mar. 6, 1951 |
| 2,793,101 | Weihe | May 21, 1957 |

FOREIGN PATENTS

| | | |
|---|---|---|
| 348,174 | Great Britain | May 4, 1931 |
| 19,485 | Australia | Jan. 24, 1935 |

OTHER REFERENCES
Duffy: Official Digest, June 1949, pages 347–352.